United States Patent [19]

Yoneda et al.

[11] Patent Number: 5,278,586
[45] Date of Patent: Jan. 11, 1994

[54] IMAGE FORMING APPARATUS WITH AUTOMATIC MULTIPLE IMAGE ALIGNMENT

[75] Inventors: Satoru Yoneda, Machida; Toshikazu Kawaguchi, Toyokawa, both of Japan

[73] Assignee: Minolta Camera Kabushiki Kaisha, Japan

[21] Appl. No.: 837,812

[22] Filed: Feb. 18, 1992

[30] Foreign Application Priority Data

Feb. 19, 1991 [JP] Japan .................. 3-024479

[51] Int. Cl.$^5$ .................. G03G 15/01
[52] U.S. Cl. .................. 346/157; 346/108; 355/326 R
[58] Field of Search .................. 346/108, 157, 160; 355/326, 327, 246

[56] References Cited

U.S. PATENT DOCUMENTS

| | | | |
|---|---|---|---|
| 4,239,372 | 12/1980 | Iwai | 355/246 |
| 4,467,334 | 8/1984 | Anzai | 346/160 |
| 5,113,202 | 5/1992 | Loce et al. | 346/108 |

FOREIGN PATENT DOCUMENTS

| | | | |
|---|---|---|---|
| 56-148567 | 11/1981 | Japan | 346/157 |
| 63-35052[U] | 3/1988 | Japan . | |
| 2-40667 | 2/1990 | Japan | 346/157 |

*Primary Examiner*—Joan H. Pendegrass
*Attorney, Agent, or Firm*—Price, Gess & Ubell

[57] ABSTRACT

An image forming apparatus having a rotatable image carrier, a first exposing device for forming an electrostatic latent image by irradiating an optical beam according to image data to the image carrier, a second exposing device to from another electrostatic latent image by irradiating an optical beam according to image data to the image carrier in a different irradiating position on the image carrier by the first exposing device, a developing device for developing the electrostatic latent images formed by the first exposing device and second exposing device, and a device for transferring the developed electrostatic images all together on the surface of a recording medium, has a device to form a first and a second pattern latent image on the image carrier by concurrently operating the first and the second exposing device while the image carrier is on the rotation at the first speed, a pattern detecting device for detecting the first and the second pattern latent image, a measuring device for measuring a time interval between the detection of the second pattern latent image and the detection of the first pattern latent image, and a controlling device for controlling an operation of exposing responding to image data of the first and the second exposing device on the basis of the time measured by the measuring device while the image carrier is on the rotation at the second speed.

18 Claims, 7 Drawing Sheets

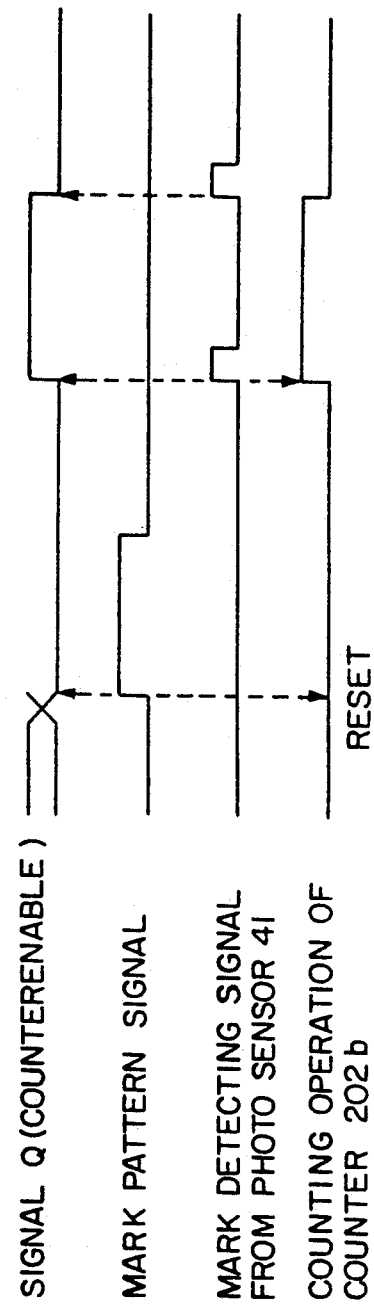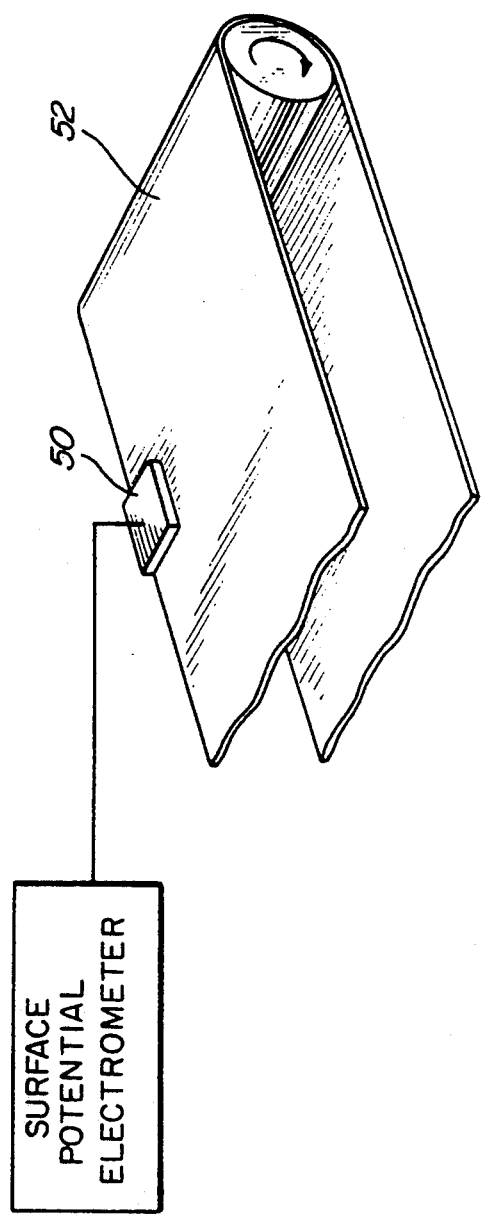

IMAGE FORMING APPARATUS WITH AUTOMATIC MULTIPLE IMAGE ALIGNMENT

BACKGROUND OF THE INVENTION

(1) Field of the Invention

The present invention relates to an image forming apparatus such as a page printer, a copying machine or the like. More specifically, to an image forming apparatus designed to form a multi-image by irradiating several laser beams or the like onto a photosensitive body.

(2) Description of the Related Art

A conventional image forming apparatus shown in FIG. 7 is designed to form a multi-image in two or more colors by developing an electrostatic latent image by a developing device 3a after the electrostatic lament image is formed on the surface of a photosensitive drum 30 by irradiating an optical beam B1, and subsequently, by developing another electrostatic latent image by a developing device 3b after the electrostatic latent image is formed on the surface of the photosensitive drum 30 which has passed the developing device 3a.

In a conventional image forming apparatus, irradiating position of the optical beams B1 and B2, timings of irradiation of the optical beams B1 and B2, and a speed of rotation of the photosensitive drum 30 should maintain a certain correlation, otherwise the image formed by the optical beam B1 and B2 respectively will not be formed in a specified position which results in unexpected color positioning and the deterioration of the image quality.

Japanese utility model Kokai No. 63-35052 teaches an image forming apparatus provided with an optical sensor at the lower irradiating position of the optical beam in the rotating direction of the photosensitive body, wherein a timing of the irradiation of a lower optical beam is controlled by the optical sensor in accordance with the timing when the optical sensor detects a starting position from the image formed by the upper optical beam.

However, in the above apparatus, displacement between the two images continuously occurs until the irradiating position of the lower optical beam strictly fits to the position detected by the optical sensor. Therefore, a great amount of time and labor has been consumed to fit the irradiating position to the position detected by the optical sensor.

SUMMARY OF THE INVENTION

The present invention has an object to provide an image forming apparatus with a capability of solving a problem of image displacement without requiring a finer adjustment thereof.

Above object is fulfilled by providing an apparatus with exposing devices which irradiate optical beams concurrently to different positions on an image carrier in order to form a pattern images on the surface thereof, a measuring device which measures a time interval between a detection of a pattern image and a detection of another by a pattern sensor, a control unit which controls the exposing operation of each exposing device according to the time interval measured by the measuring device.

Thanks to the present invention, the problems of image displacement can be solved regardless to the displacement of the position whereto each exposing optical beam is irradiated without requiring a fine positioning by a pattern sensor, which makes for an enhancement of image quality.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 is a timing chart which shows the operation of the time interval detector incorporated in the copying machine.

FIG. 8 is a partial schematic view of a photosensitive belt and surface potential electrometer.

DESCRIPTION OF THE PREFERRED EMBODIMENT

By referring to FIG. 1 through FIG. 6, an embodiment of the present invention incorporated in a copying machine is explained, wherein a two-color image is formed by developing each electrostatic image with a different color toner after they are formed by two optical beams respectively. More specifically, an image is formed by selecting a black image in a monochrome mode, a red image in a monochrome mode, and a simultaneous two-color mode in which a black image and red image are simultaneously recorded on a recording medium such as a sheet.

Figure 1:
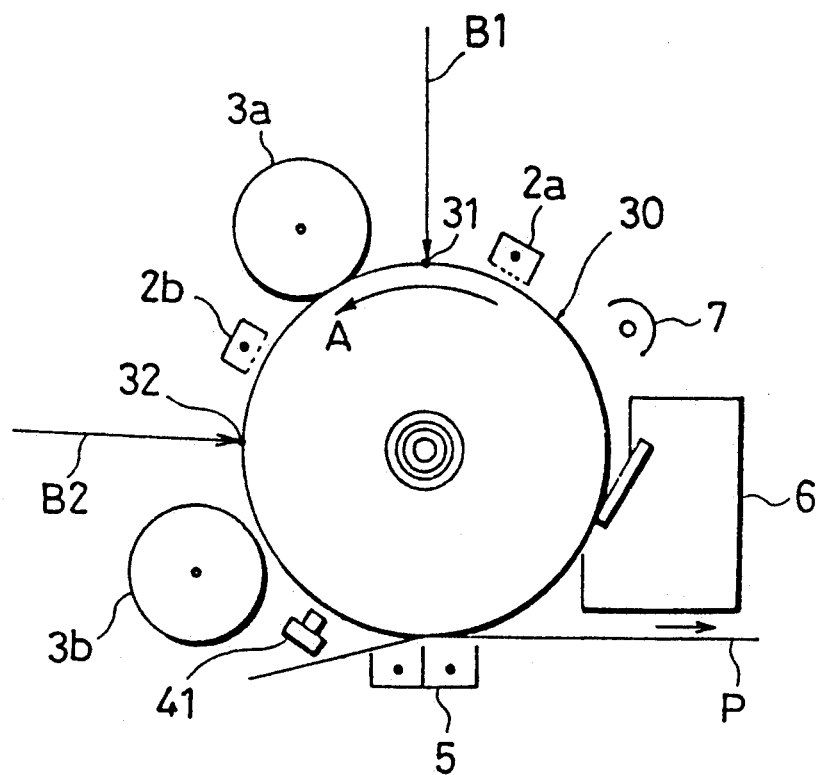
FIG. 1 is a schematic view which shows a structure of the main body of a copying machine described in the embodiment of the present invention.

A copying machine shown in FIG. 1 is designed to take following steps;

A photosensitive drum 30 is set to turn counterclockwise (direction of an arrow A). The surface of the photosensitive drum 30 is discharged by an eraser lamp 7, then, the surface of the photosensitive drum 30 is charged uniformly by a first charger 2a as a precharger. A first electrostatic latent image is formed by scanning an optical beam B1 on the scanning line 31 direction(in a direction perpendicular to the sheet) on the surface of the photosensitive drum 30. The first electrostatic latent image is developed by a first developing device 3a. The surface of the photosensitive drum 30 which has passed the first developing device 3a is charged uniformly by a second charger 2b as a precharger. A second electrostatic latent image is formed by scanning an optical beam B2 on the scanning line 32 (in a direction perpendicular to the sheet) on the surface of the photosensitive drum 30. The second electrostatic latent image is developed by a second developing device 3b. In addition, the copying machine is provided with a transformer charger 5 and a cleaner 6. The transformer charger 5 transfers the image developed by both or either the first developing device 3a and/or the second developing device 3b on recording media such as papers, and the cleaner 6 cleans the surface of the photosensitive drum 30 after the images are transferred on the recording media.

Figure 2:
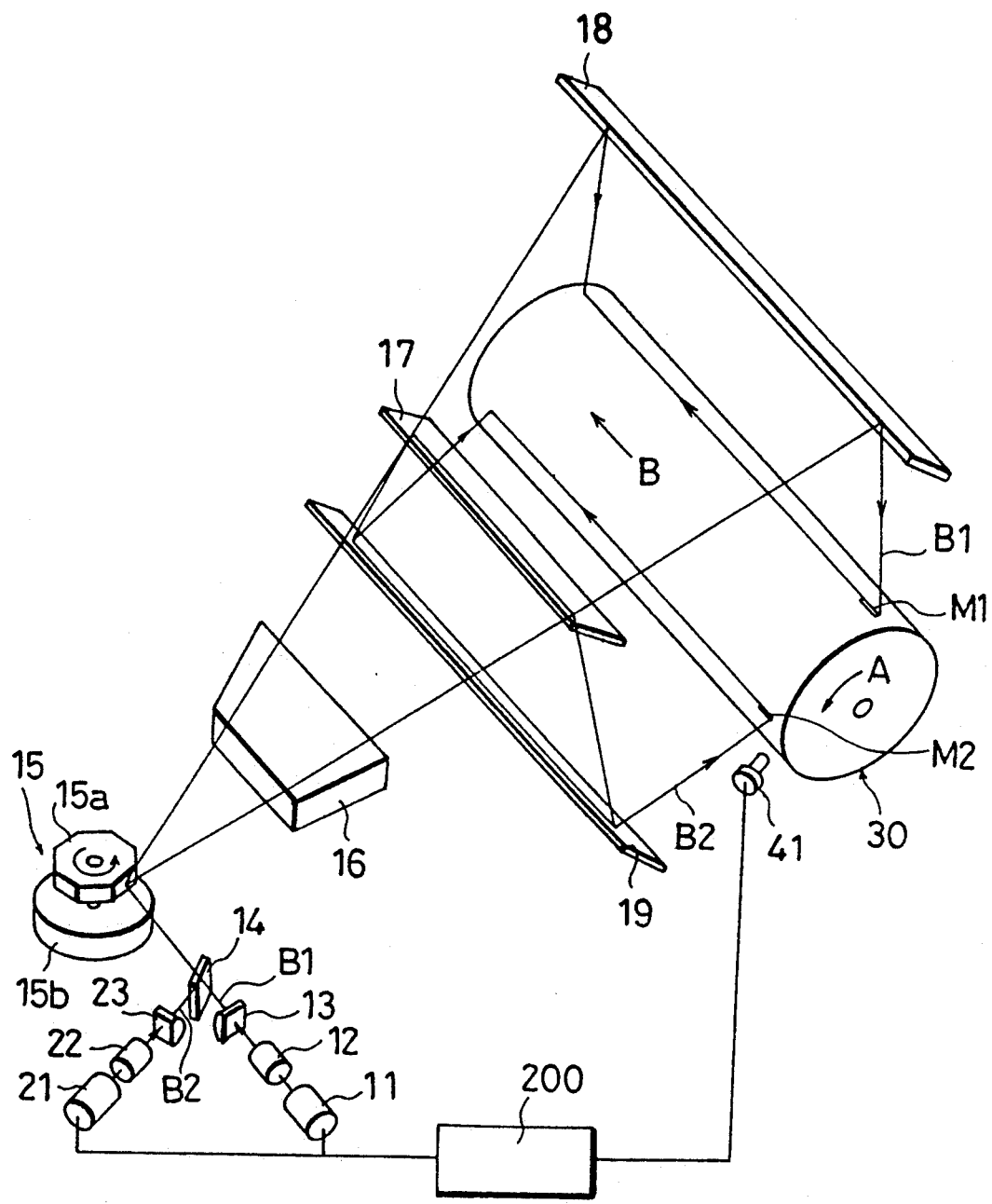
FIG. 2 is a perspective view which shows the structure of optical system members for the optical apparatus incorporated in the copying machine.

An optical device for irradiating the optical beam B1 and B2 on the photosensitive drum 30 has a structure as shown in FIG. 2.

In FIG. 2, 11 and 21 are semiconductor lasers, 12 and 22 are converging lenses, 13 and 23 are cylindrical lenses, 14 is synthetic mirror, 15 is a deflector, 15a is a polygon mirror, 15b is a polygon motor, 16 is a toric f$\theta$ lens, 17 is a separating filter, 18 is a first mirror, 19 is a second mirror, 41 is a reflecting photo sensor, and 200 is a control unit.

A semiconductor laser 11 and 12 respectively emits an optical beam with a wave-length 810 nm and 750 nm under a control of the control unit 200. A synthetic mirror 14 transmits an optical beam B1 and B2 separately after incident along the same optical path to a polygon mirror 15a by letting the optical beam B1 with the longer wave-length be transmit through, while reflecting the optical beam B2 with the shorter wavelength.

By the same principle, the separating filter 17 separates the optical beam B1 and B2 into two different beam paths, while both of which are irradiated to be incident thereto along the same optical path. The polygon motor 15b drives the polygon mirror 15a, whereby the optical beam B1 and B2 irradiated to be incident thereto are scanned on the scanning direction shown as an arrow B.

Figure 3:
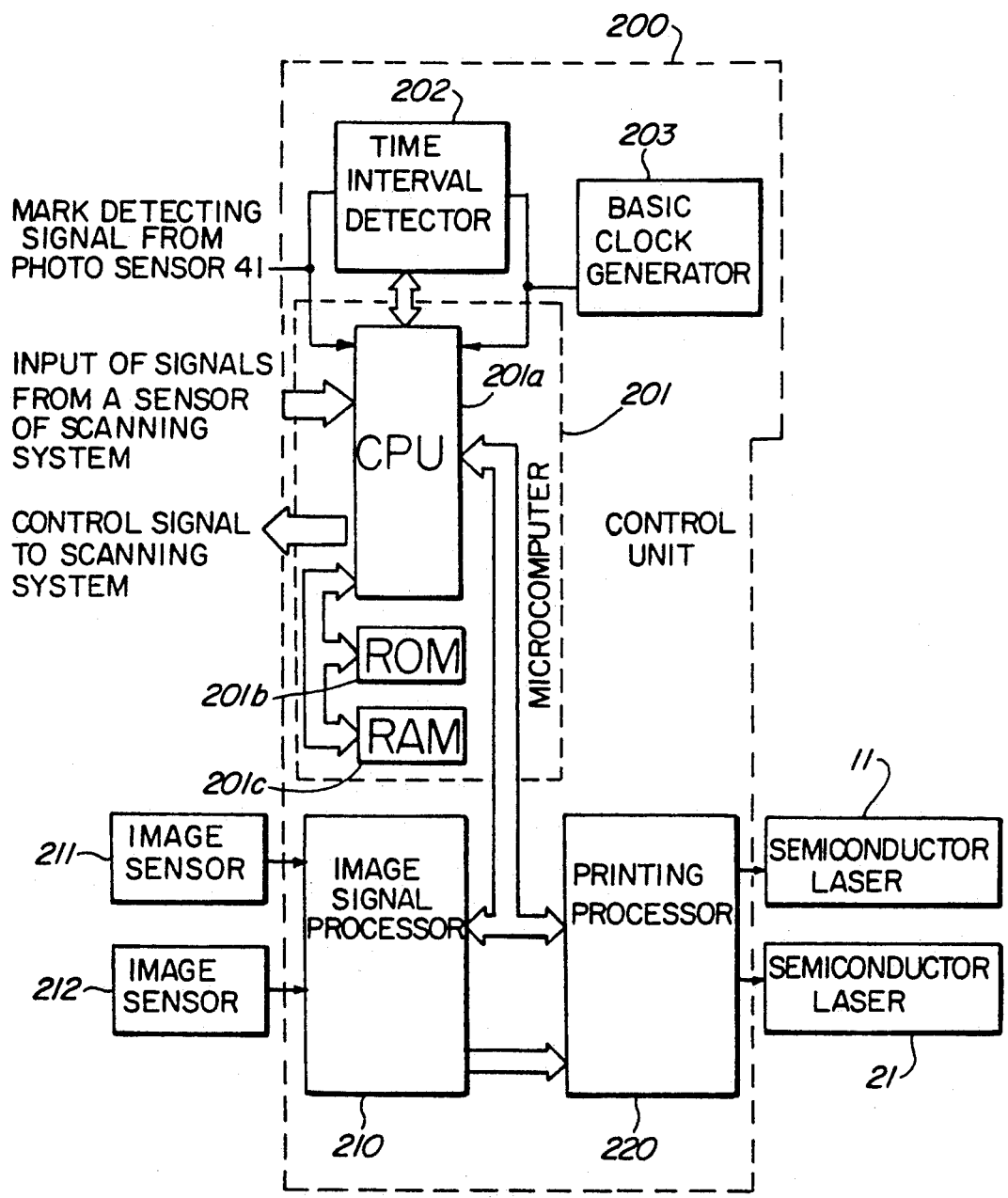
FIG. 3 is a block view which shows the structure of the main body of a control unit incorporated in the copying machine.

FIG. 3 is a block view which shows a structure of the main body of a control unit 200, wherein a microcomputer 201 comprising a CPU(a Central Processing Unit)201a, a ROM(Read Only Memory)201b, and a RAM(Random Access Memory)201c is installed. The microcomputer 201 decodes signals from switches and sensors on the control panel such as a print button, a simultaneous two-color selecting button, color selecting button and the like (not shown). Also it controls actuators or the like and indicates the operating condition as well as controls a image signal processor 210 and a printing processor 220.

The image signal processor 210 produces and modifies image data in accordance with image signals outputted from image sensors 211 and 212, whereby the original images are read.

The printing processor 220 drives the semiconductor laser 11 and 21 in accordance with the image data or the like outputted from the microcomputer 201 and the image signal processor 210.

Figure 4:
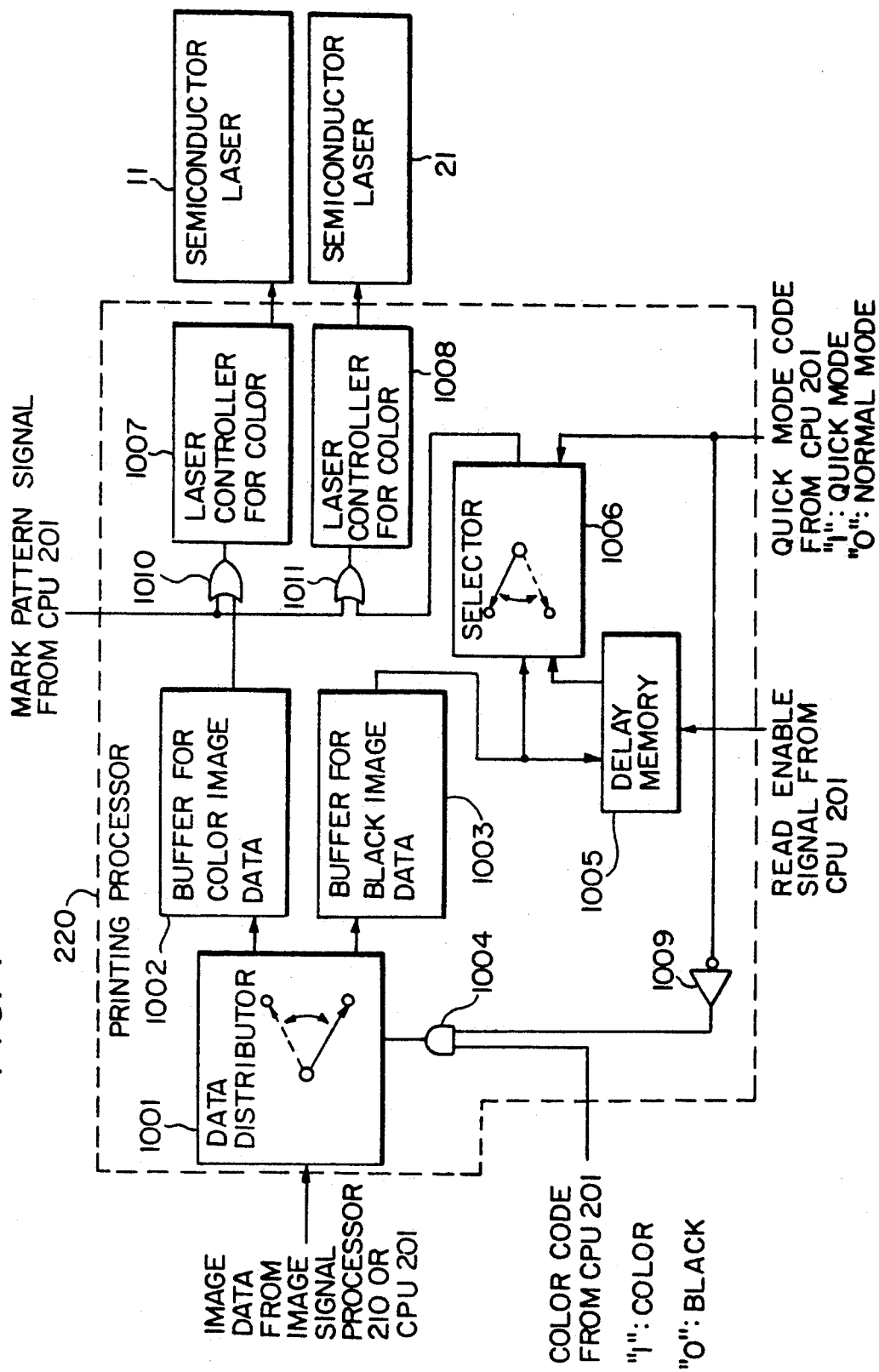
FIG. 4 is a block view which shows the structure of a printing processor incorporated in the copying machine.
Figure 5:
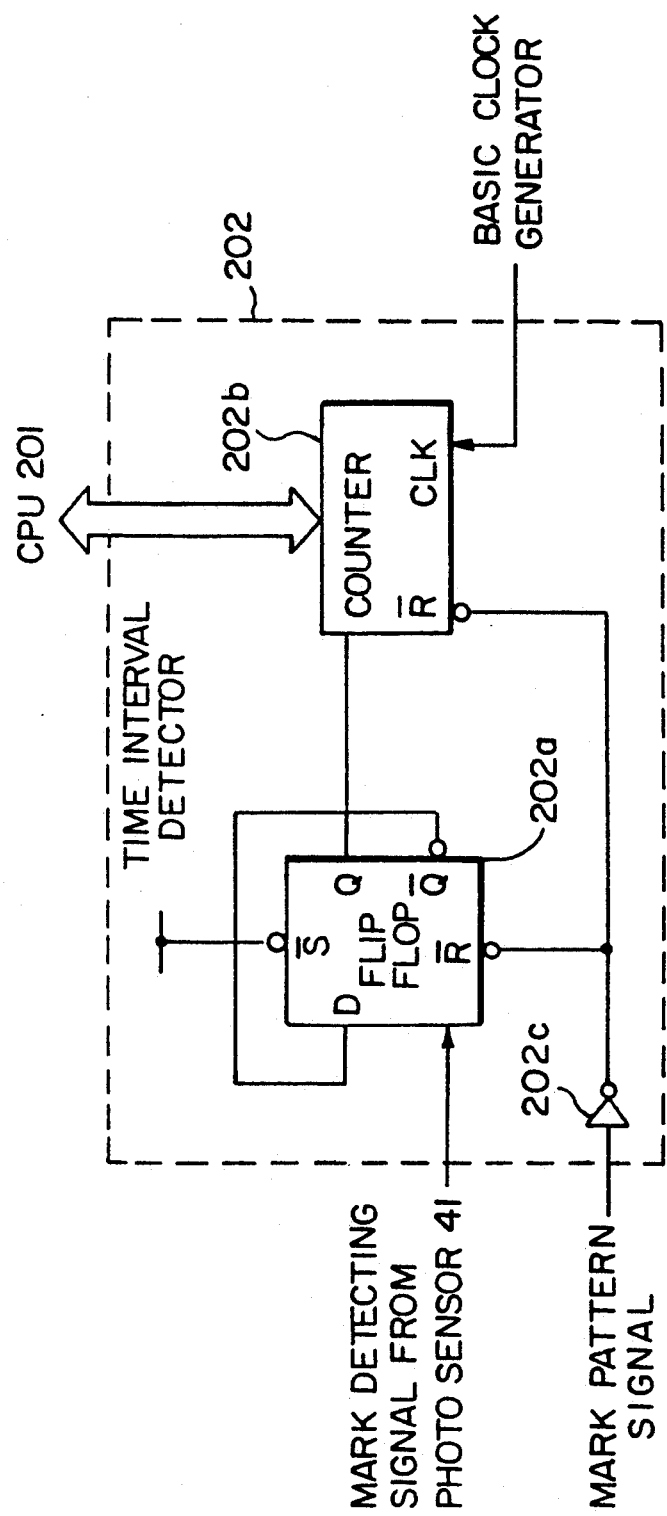
FIG. 5 is a block view which shows the structure of the time interval detector incorporated in the copying machine.
Figure 7:
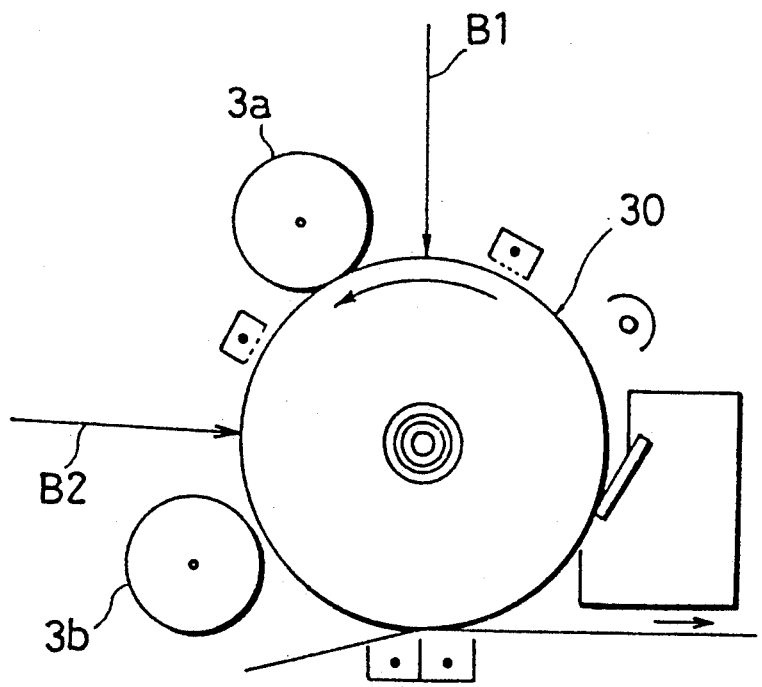
FIG. 7 is a schematic view which shows a structure of the main body of a conventional copying machine.

FIG. 4 is a block diagram view which shows a structure of the printing processor 220, whereby the image data received from the microcomputer 201 and the image signal processor 210 are inputted into a data distributor 1001, then, inputted into either a buffer for color image data 1002 or a buffer for black image data 1003 as the data distributor 1001 switches back and forth in a manner described hereinunder.

In order to output the image data either to the buffer for color image data 1002 or the buffer for black image data 1003, the data distributor 1001 switches back and forth according to a color code it receives through an AND gate 1004 from the microcomputer 201 and the image signal processor 210 synchronously with the input of the image data thereto. For example, value "1" is given as a color code and value "0" is given as a black code herein. Moreover, a quick mode code is inputted to the AND gate 1004 through an invertor 1009 from the microcomputer 201. For example, when black is selected in a monochrome mode with a color selecting button, value "1$\lambda$ which is given as a quick mode code, whereas the value automatically resets to "0" which is given as a normal mode code, when red is selected in a monochrome mode or a simultaneous two-color mode is selected with a simultaneous two-color button.

In other words, the data distributor 1001 switches to the buffer for color image data 1002 only to the combination of the value "1" (=color) of the color code and the value "10" (=normal) of the quick mode code and it switches to the buffer for black image data 1003 for the other combinations.

The buffer for color image data 1002 adjusts synchronism in every line for the color image data and timings to start the scanning, therefrom the image data are outputted and, through an OR gate 1010, inputted into a laser controller for color 1007 which outputs modulated signals according to the image data. The semiconductor laser 11 is set to either ON or OFF in response to the modulated signals.

The buffer for black image data 1003 does the same process mentioned above except the color image data are the black image data herein. The image data outputted from the buffer for black image data 1003 are inputted into a selector 1006 either directly or through a delay memory 1005.

The delay memory 1005 compensates displacement caused by the differences of exposing position by the optical beam B1 and B2. When the simultaneous two-color mode is selected, it delays the black image data for the time required by the photosensitive drum 30 to rotate between the intervals of exposing position of said two optical beams. The delayed time is equivalent to the time from the buffer for black image data 1003 to start outputting the image data until the delay memory 1005 receives a read enable signal from the microcomputer 201. The timing of output of the read enable signal from the microcomputer 201 is adjusted by detecting exposure time interval described hereinafter.

In accordance with the quick mode data from the microcomputer 201, a selector 1006 selects the image data directly from the buffer for black image data 1003 responding to the quick mode code, while it selects the output through the delay memory 1005 responding to the normal mode code. Then the image data are inputted into a laser controller for black 1008 through an OR gate 1011. The laser controller for black 1008 outputs the modulated signals as in the same manner described in the laser controller for color 1007. The semiconductor laser 21 is set to either ON or OFF in response to the modulated signals.

In other words, as described above, when the quick mode is selected, a black image is formed quickly due to the input of the image data into the laser controller for black 1008 without delay, as the data distributor 1001 selects the buffer for black image data 1003 regardless to the color data while the selector 1006 selects the output from the buffer for black image data 1003.

While an exposure time interval detector is on the operation, mark pattern signals from the microcomputer 201 are inputted to the OR gate 1010 and the OR gate 1011, each of which is connected to the laser controller for color 1007 and the laser controller for black 1008 respectively, then such marks are formed on the surface of the photosensitive drum 30.

The exposure time interval detector 202 and a basic clock generator 203 are installed in the control unit 200 in addition to the devices described hereinabove.

The exposure time interval detector 202 comprises a flip-flop 202a, a counter 202b, and an inverter 202c. During its operation, it senses the time interval between the detection of the two marks formed by the exposure to the optical beam B1 and B2 respectively by a photo sensor 41.

In the above structure, the exposure time interval is detected as follows when the copying machine is on the start up or in the system reset:

The microcomputer 201 turns the photosensitive drum 30 and operates the eraser lamp 7, the first charger 2a, and second developing device 3b. The speed of rotation of the photosensitive drum 30 may be equal to a speed to which the photosensitive drum 30 turns when the images are formed, or may be slower than the speed in order to improve the detecting performance of the exposure time interval. When different speeds are applied, each of the speeds can be calculated from the exposure time interval and the ratio of the two speeds.

The microcomputer 201 outputs the mark pattern signals as the image data to a printing processor 220.

The laser controller for color 1007 and the laser controller for black 1008 of the printing processor 220 concurrently outputs the modulated signals according to the mark pattern signals. The semiconductor laser 11 and 12 respectively emit the optical beams B1 and B2 in order to form the electrostatic latent images of a mark M1 and a mark M2 on the photosensitive drum 30, and both marks are developed by the second developing device 3b. The mark M1 may be developed by the first developing device 3a, however, forming the mark M1 and M2 in the same color by developing through the second developing device 3b is preferable in respect of the detecting accuracy.

The mark pattern signals are also inputted into the exposure time interval detector 202 from the microcomputer 201, wherein the flip-flop 202a and the counter 202b of the exposure time interval detector 202 are reset as shown in FIG. 6.

When the mark M2 passes the photo sensor 41 as the photosensitive drum 30 turns, the photo sensor outputs the mark detecting signals, whereupon the signal Q of the flip-flop 202a becomes "H" level and the counter 202b starts counting the clock from the basic clock generator 203.

As the photosensitive drum 30 turns farther, the mark M1 passes by the photo sensor 41, which outputs the mark detecting signals again, whereupon the signal of the flip-flop 202a returns to "L" level and the counter 202b stops counting.

When the photo sensor 41 outputs the second mark detecting signals, the microcomputer 201 reads the count value of the counter 202b and stores it in RAM 201c as data of the exposure time interval.

On the other hand, when forming a multi-image, the image data outputted from the buffer for color image data 1002 are directly inputted into the laser controller for color 1007, upon which the photosensitive drum 30 is exposed to the optical beam B1 emitted from the semiconductor laser 11. Then the image data outputted from the buffer for black image data 1003 are stored in the delay memory 1005. After a period of time, according to the data of the exposure time interval, has passed, the read enable signal is outputted from the microcomputer 201 to the delay memory 1005. Then it is inputted into the laser controller for black 1008, upon which the photosensitive drum 30 is exposed to the optical beam B2 emitted from the semiconductor laser 21.

Therefore, as described above, by sensing automatically the exposure time interval through detecting the intervals of the irradiating position of the optical beam B1 and B2, and by delaying the exposure by the optical beam B2 in accordance with the exposure time interval sensed thereof, the exposing position on the photosensitive drum 30 by each optical beam strictly fit to each other without displacement, moreover, no mechanical adjustments for optical system members or the like is necessary.

Although, in the embodiment described above, the examples are given wherein the exposure time interval is sensed when the copying machine is on the start up or on the system reset, it may be sensed before a multi-image is formed or it may be sensed periodically.

A photo sensor which detects marks may also serve as a AIDC(Auto Image Density Control) sensor which checks the condition of development according to the output voltage to regulate the toner supply.

A surface potential electrometer 50, as shown in FIG. 8, may replace the photo sensor in order to detect the electrostatic latent image marks formed on the photosensitive drum 30 without operating the first developing device 3a and the second developing device 3b.

The microcomputer may detect the exposure time interval or delay outputting of the image data by a software program in place of the counter or the delay memory utilized in the above embodiment.

The separating filter 17 may be replace by a type of filter which separates the optical beam by the difference of a plane of polarization, herein the filter which separates beams by the difference of the wave-length is utilized.

A photosensitive belt 52, as shown in FIG. 8, may replace a photosensitive drum.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
   a rotatable image carrier;
   first exposing means for forming an electrostatic latent image by irradiating an optical beam according to first image data to said image carrier at a first irradiating position;
   second exposing means for forming another electrostatic latent image by irradiating an optical beam according to second image data to said image carrier at a second irradiating position offset from said first irradiating position;
   developing means for developing the electrostatic latent image s formed by said first exposing means and the second exposing means;
   means for transferring the developed electrostatic images onto the surface of a recording medium;
   means for forming a first and a second pattern latent images on respectively said first and second irradiating positions on said image carrier by concurrently operating said first and second exposing means while said image carrier is being rotated at a first speed;

pattern detecting means for detecting said first and second pattern latent image;

measuring means for measuring a time interval, relative to rotation of said rotatable image carrier, between the detection of said second pattern latent image and the detection of said first pattern latent image, and controlling means for controlling an operation of exposure according to image data of said first and second exposing means on the basis of the time interval measured by said measuring means while said image carrier is being rotated at a second speed.

2. An image forming apparatus of claim 1, wherein said image carrier is a photosensitive drum.

3. An image forming apparatus of claim 1, wherein said image carrier is a photosensitive belt circulated by two rollers.

4. An image forming apparatus of claim 1, wherein
said first rotating speed of said image carrier being set to be equivalent to said second rotating speed of said image carrier; and
said controlling means initiating the exposing operation of said second exposing means according to image data after a period of time equivalent to the time measured by said measuring means from initiating the operation of said first exposing means.

5. An image forming apparatus of claim 1, wherein
said first rotating speed of said image carrier being set to be different to said second rotating speed of said image carrier; and
said controlling means initiating the exposing operation according to image data of said second exposing means after a period of time on the basis of the time measured by said measuring means and the speed ratio between said first and second speed from initiating the operation of said first exposing means.

6. An image forming apparatus of claim 1, wherein said first rotating speed of said image carrier is set to be slower than said second rotating speed of said image carrier.

7. An image forming apparatus of claim 1, wherein said pattern detecting means includes a surface potential electrometer.

8. An image forming apparatus of claim 1, wherein said pattern detecting means includes a photo sensor to detect said first and second pattern latent images after they are developed by developing means.

9. An image forming apparatus of claim 8, wherein said photo sensor also serves as a sensor detecting the tone of developed images.

10. An image forming apparatus of claim 8, wherein said developing means includes several developing devices, each of which contain a different color toner therein, said developing means develops said first and second pattern latent images by the same developing device.

11. An image forming apparatus of claim 1, wherein said first and second pattern latent images are controlled so as to be formed prior to every image forming operation.

12. An image forming apparatus of claim 1, wherein said first and second pattern latent images are controlled so as to be formed periodically.

13. An image forming apparatus of claim 1, wherein said first and second pattern latent images are formed when said image forming apparatus is on at least one of the start up and the reset mode of operation.

14. An image forming apparatus comprising:
a rotatable image carrier;
first exposing means irradiating an optical beam according to image data to said image carrier;
a second exposing means irradiating an optical beam according to image data to a downstream position in the rotating direction of said image carrier from that of said first exposing means;
means for selecting one of a image forming mode and a pattern forming mode;
first controlling means for controlling the operation of said first and second exposing means with a different timing in order to form a electrostatic latent image according to image data;
second controlling means for controlling the operation of said first and second exposing means concurrently in order to form a first and a second pattern latent images on said image carrier;
means for detecting said first and second pattern latent images;
measuring means for measuring a time interval between the detection of said second pattern latent image and said first pattern latent image; and
means for adjusting the operation timing of said first and second exposing means on the basis of the time measured by said measuring means in said image forming mode.

15. An image forming apparatus comprising:
a rotatable image carrier;
first exposing means irradiating an optical beam according to a first image data to said image carrier;
second exposing means irradiating an optical beam according to a second image data to said image carrier in the different exposing position from that of said first exposing means;
output delaying means for outputting said second image data to said second exposing means after a specified period of time through storing;
means for selecting one of an image forming mode and a pattern forming mode;
first controlling means for controlling the outputting of said second image data to said second exposing means through said delaying means in order to form an electrostatic image according to image data;
second controlling means for controlling the output of said second image data directly to said second exposing means in order to form a first and a second pattern latent images;
pattern detecting means for detecting said first and second pattern latent images;
measuring means for measuring a time interval between the detection of image recorded by said second exposing means and the detection of the image recorded by said first exposing means through said pattern detecting means in said pattern forming mode; and
third controlling means for controlling a timing to output said second image data from said output delaying means on the basis of the time measured by said measuring means.

16. An image forming apparatus of claim 15, said apparatus further comprising:

memory means for storing the result of measurement by said measuring means, wherein said output delaying means is controlled by said controlling means in accordance with the result of measurement stored by said memory means.

17. An image forming apparatus of claim 15, wherein an irradiating position of said second exposing means is offset from that of said first exposing means in the rotating direction of said image carrier, and wherein a timing of outputting of said second image data is delayed by said third controlling means on the basis of the time measured by said measuring means.

18. An image forming apparatus of claim 15, said apparatus further comprising:

image reading means for outputting first and second image data by reading an original image.

* * * * *